(12) United States Patent
Lochbihler

(10) Patent No.: US 10,207,533 B2
(45) Date of Patent: Feb. 19, 2019

(54) SECURITY ELEMENT HAVING A COLOR FILTER, DOCUMENT OF VALUE HAVING SUCH A SECURITY ELEMENT AND PRODUCTION METHOD FOR SUCH A SECURITY ELEMENT

(75) Inventor: Hans Lochbihler, Munich (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 152 days.

(21) Appl. No.: 13/513,284

(22) PCT Filed: Dec. 3, 2010

(86) PCT No.: PCT/EP2010/007370
§ 371 (c)(1),
(2), (4) Date: Jun. 1, 2012

(87) PCT Pub. No.: WO2011/066992
PCT Pub. Date: Jun. 9, 2011

(65) Prior Publication Data
US 2012/0235399 A1    Sep. 20, 2012

(30) Foreign Application Priority Data
Dec. 4, 2009 (DE) .................. 10 2009 056 933

(51) Int. Cl.
*B42D 25/369* (2014.01)
*G02B 5/22* (2006.01)
(Continued)

(52) U.S. Cl.
CPC ........... *B42D 25/369* (2014.10); *B42D 25/00* (2014.10); *B42D 25/355* (2014.10); *B42D 25/45* (2014.10);
(Continued)

(58) Field of Classification Search
CPC .......... B42D 15/00; B42D 15/10; G09C 3/00; G02B 5/18; G02B 27/44
USPC .................. 283/72, 82, 87, 91, 94, 98, 107; 359/558, 566, 568, 569, 570, 572, 573, 359/575, 576
See application file for complete search history.

(56) References Cited

U.S. PATENT DOCUMENTS 4,605,846 A * 8/1986 Duret .................. G06K 19/10
                                              235/456
4,705,356 A * 11/1987 Berning et al. ............. 359/590
(Continued)

FOREIGN PATENT DOCUMENTS

DE        103 08 305         9/2004
DE   10 2005 021 514 A1    11/2006
(Continued)

OTHER PUBLICATIONS

International Search Report for PCT/EP2010/007380, dated Mar. 4, 2011 (2 pages).
IPRP from PCT/EP2010/007370, dated Jun. 5, 2012 (6 pages).

*Primary Examiner* — Justin V Lewis
(74) *Attorney, Agent, or Firm* — Workman Nydegger

(57) ABSTRACT

A security element (1) for security papers, documents of value or the like, having a substrate (3) the upper face (6) of which is height-modulated, and has a multilayer structure (7) which acts as a color filter. The structure is formed on the height-modulated upper face (6) and is likewise height-modulated as a result, and includes a first layer (8), a second layer (9) of dielectric material formed thereon and a third layer (10) formed on the second layer (9), wherein the first and third layer (8,10) are each formed from a dielectric material having a higher refractive index than that of the second layer (9), or in each case from a metal or semi-metal material.

24 Claims, 18 Drawing Sheets

(51) Int. Cl.
  *B42D 25/45* (2014.01)
  *B42D 25/355* (2014.01)
  *G02B 5/18* (2006.01)
  *G02B 5/20* (2006.01)
  *G02B 5/28* (2006.01)
  *B42D 25/00* (2014.01)

(52) U.S. Cl.
  CPC ........... *G02B 5/1809* (2013.01); *G02B 5/201* (2013.01); *G02B 5/22* (2013.01); *G02B 5/286* (2013.01); *Y10T 29/49826* (2015.01)

(56) References Cited

U.S. PATENT DOCUMENTS

| | | | |
|---|---|---|---|
| 5,007,708 A | | 4/1991 | Gaylord et al. |
| 8,070,186 B2* | | 12/2011 | Einhorn et al. ................. 283/94 |
| 2003/0071972 A1 | | 4/2003 | Ito et al. |
| 2006/0001969 A1* | | 1/2006 | Wang .................... G02B 5/1809 |
| | | | 359/489.06 |
| 2007/0081246 A1 | | 4/2007 | Stuck et al. |
| 2008/0278815 A1* | | 11/2008 | Blondiaux et al. ........... 359/568 |
| 2010/0307705 A1* | | 12/2010 | Rahm .................... B42D 25/29 |
| | | | 162/140 |

FOREIGN PATENT DOCUMENTS

| | | | |
|---|---|---|---|
| EP | 1180711 A1 | 2/2002 | |
| EP | 1775142 A1 | 4/2007 | |
| WO | 2004/076197 A2 | 9/2004 | |
| WO | WO 2005120154 A2 * | 12/2005 | |
| WO | 2006/087138 A1 | 8/2006 | |
| WO | 2009/000528 A1 | 12/2008 | |
| WO | 2009/083151 A1 | 7/2009 | |
| WO | WO-2009083151 A1 * | 7/2009 | ............. B42D 25/29 |

* cited by examiner

Fig. 8a
Fig. 9a
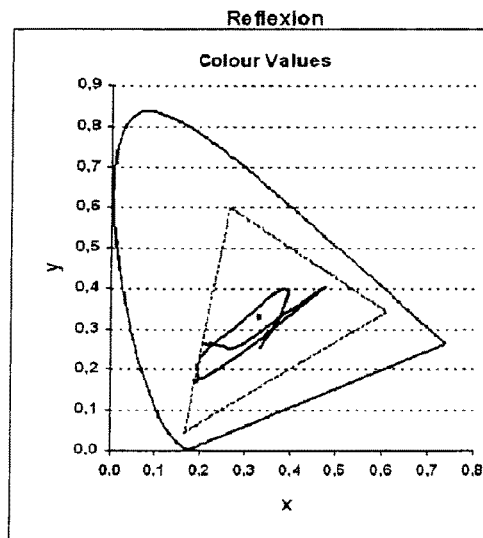
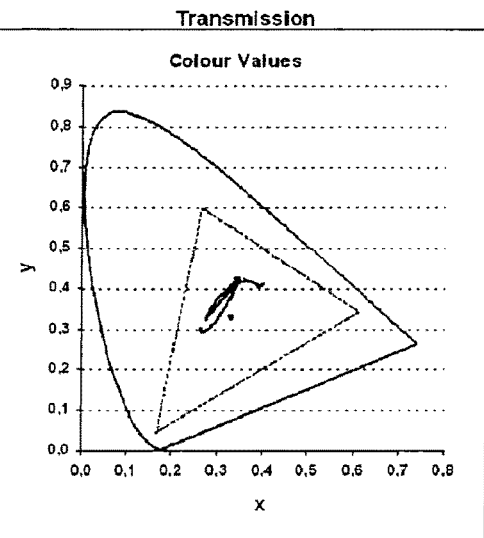
Fig. 8b
Fig. 9b
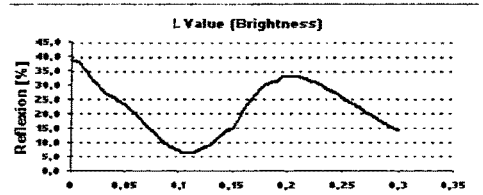
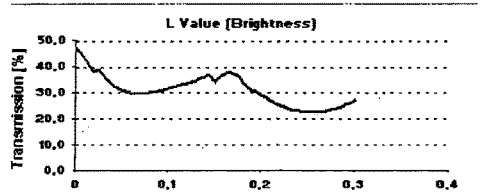
Fig. 8c
Fig. 9c
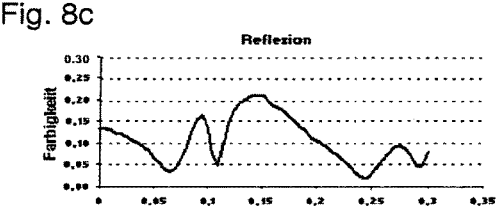
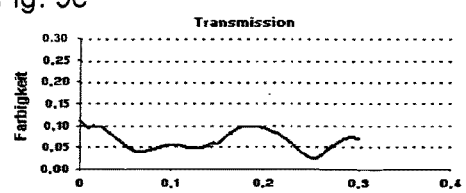

Fig. 12a
Fig. 13a
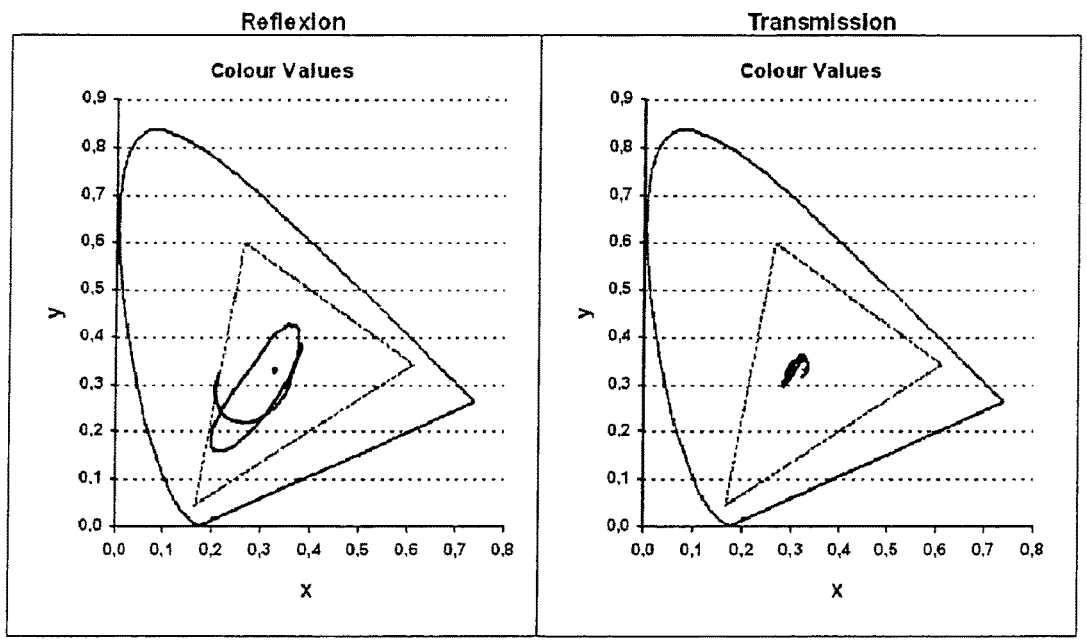
Fig. 12b
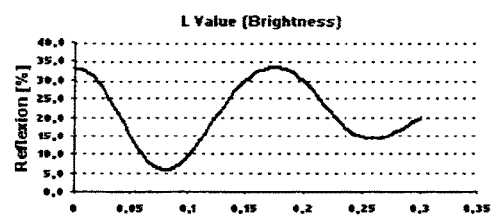
Fig. 13b
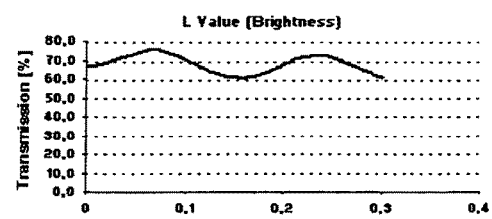
Fig. 12c
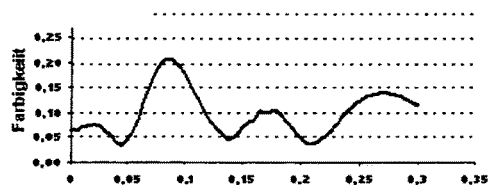
Fig. 13c
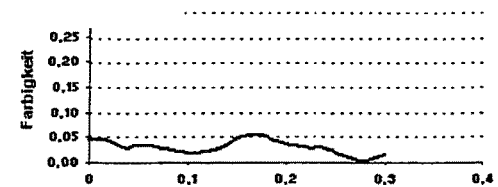

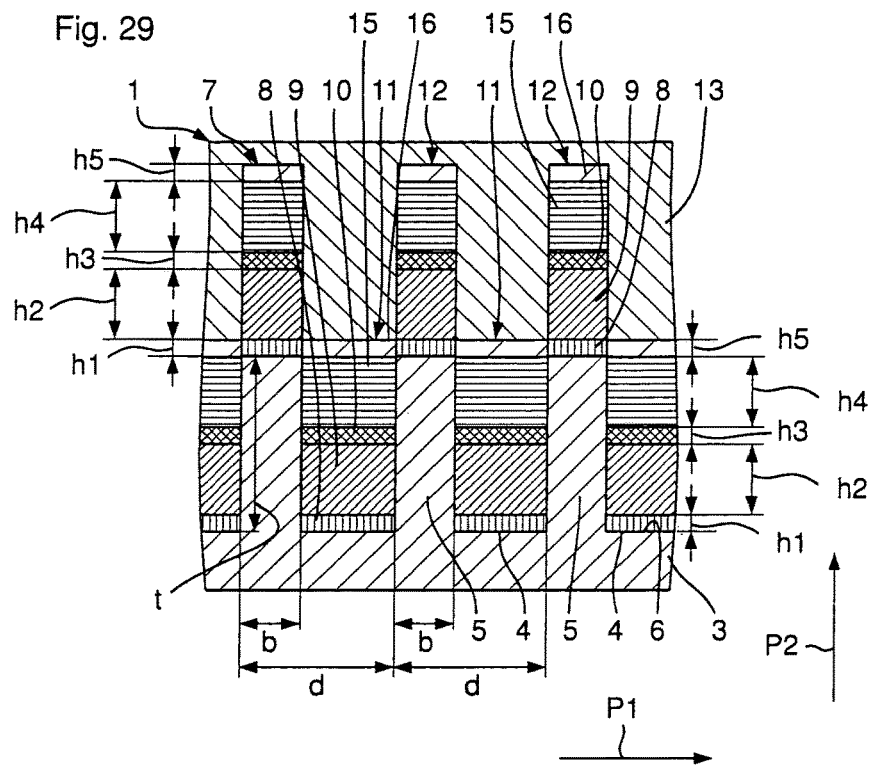
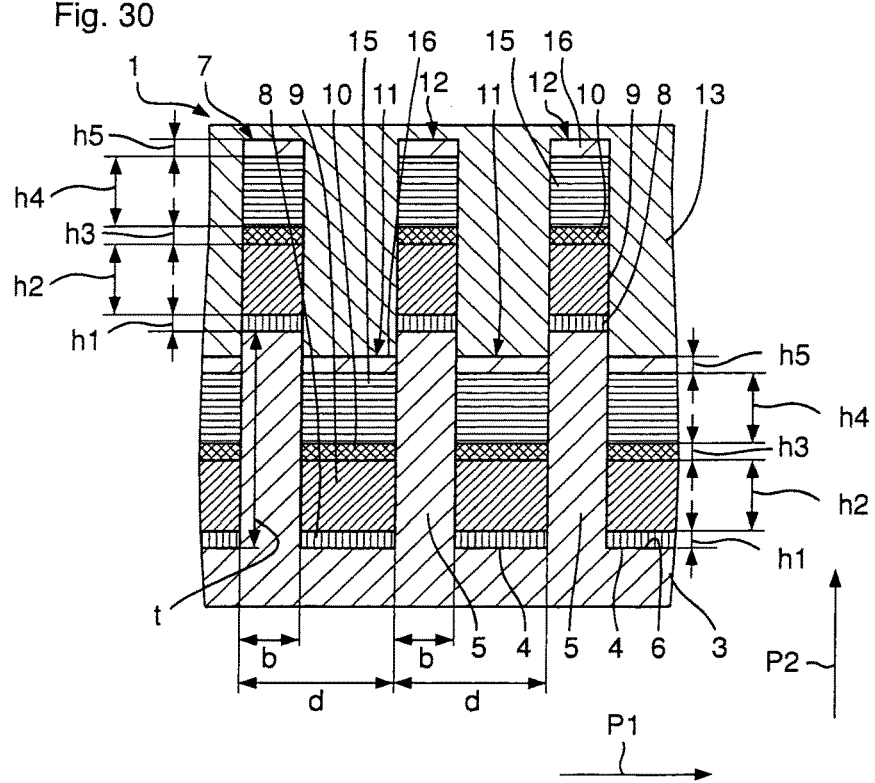

SECURITY ELEMENT HAVING A COLOR FILTER, DOCUMENT OF VALUE HAVING SUCH A SECURITY ELEMENT AND PRODUCTION METHOD FOR SUCH A SECURITY ELEMENT

BACKGROUND OF THE INVENTION

A. Field of the Invention

The invention relates to a security element having a color filter, a document of value having such a security element as well as a manufacturing method of such a security element.

B. Related Art

Objects to be protected are often equipped with a security element, which allows the object to be authenticity-checked and at the same time serves as a protection against unauthorized reproduction.

Objects to be protected are for example security papers, identity documents and documents of value (such as e.g. bank notes, chip cards, passports, identification cards, identity cards, shares, bonds, deeds, vouchers, checks, admission tickets, credit cards, health cards, etc) as well as elements for the product protection, such as e.g. labels, seals, packagings, etc.

For such security elements there are known different structures in order to achieve color-influencing effect. There can be employed interference filters, thin semi-transparent metal layers with selective transmission through plasma resonance effects, nanoparticles, micro-perforated metal foils and wire gratings, photonic crystals, metallic gratings with excitation of surface plasmon polaritons, wire gratings with exploitation of the resonance in TE polarization and subwavelength gratings metallically vapor-deposited at an oblique angle, so-called z gratings.

The production of finely structured multi-color motifs, however, has so far only been known for z gratings. For this purpose, it is necessary to vary at least one structure parameter laterally within the motif region in order to thereby produce the desired color at the target positions. The production of the color through z gratings is very suitable in transmission. In reflection, however, the color contrast is only little pronounced and only a relatively small region of the color space can be represented.

On these premises, it is the object of the invention to provide a security element having a color filter with which an as large a region of the color space as possible can be covered and which is suitable both for reflection and for transmission.

SUMMARY OF THE INVENTION

According to the invention, the object is achieved through a security element for security papers, documents of value or the like, having a carrier whose upper side is height-modulated and having a multilayer structure acting as a color filter, which multilayer structure is formed on the height-modulated upper side and thus is also height-modulated and which comprises a first layer, a second layer of dielectric material formed thereon as well as a third layer formed on the second layer, whereby the first and third layers are formed respectively of a dielectric material with a refractive index higher than that of the second layer, or respectively of a metallic material or respectively of a semimetal.

With such a security element both in reflection and in transmission there can be achieved good results. In particular, a relatively large color space can be covered.

As metallic material there can be employed metals, such as e.g. aluminum, gold, silver, copper, palladium, chromium, nickel and/or tungsten as well as their alloys. As dielectric material there can be employed e.g. ZnS, $SiO_2$, $TiO_2$ or $MgF_2$. As semimetal there can be employed e.g. silicon or germanium. The carrier can have a radiation-curing lacquer (for example a UV lacquer), whose upper side is height-modulated. The lacquer can be present on a transparent carrier foil (for example a PET foil). In particular, the carrier can comprise a UV-curing inorganic-organic hybrid polymer, which is sold for example under the brand name Ormocer.

In the security element according to the invention the height modulation of the upper side as well as of the multilayer structure can be periodic in a first direction. It is also possible that the height modulation is additionally periodic in a second direction. For example, there can be present cylindrical depressions periodic in two dimensions (similar to a perforated structure). In particular, the grating period is smaller than the largest wavelength of the range of the electromagnetic radiation for which the security element is designed. Here, the refractive index of the surrounding material is to be taken into account, which for the above-mentioned lacquers and foils lies between 1.4 and 1.75. Preferably, the security element is designed for visible light, so that the grating period is preferably smaller than 400 nm. The grating period can be for example 330 nm.

The grating profile is preferably rectangular. The grating profile, however, can also show deviations from the rectangular form, i.e. can be rectangular-like. For example, the grating profile can be present in trapezoidal form or in the form of a rectangle with a rounded plateau or assume a sinusoidal form.

A grating profile of rectangular form is particularly easy to manufacture.

The modulation depth of the height-modulated multilayer structure can be laterally varied. Thus different colors (in reflection and/or transmission) can be set. Further, for setting the desired colors, also the grating period and/or the grating profile can be laterally varied.

Furthermore, it is possible to incorporate metallic nanoparticles into the second layer, in order to achieve desired color effects. Through a lateral variation of the distribution of the nanoparticles, the color filter effect can also be laterally varied.

Also the modulation depth of the height-modulated multilayer structure can be laterally varied, in order to influence the color filter effect.

Further, also the layer thickness of the second layer can be laterally varied, in order to vary the color effect in accordance with the intended purpose.

The layer thicknesses of the first and third layer can be the same. However, it is also possible that the layer thicknesses of the first and third layer are different. Further, for the first and third layer there can be employed respectively the same material or also different materials.

The modulation depth can also be varied in particular such that portions of the first layer and portions of the third layer form a continuous layer. In this case, particularly good color filter effects can be achieved. In particular, the dimensions can be chosen such that there occur resonances in the visible wavelength range.

Further, it has been found that the security element according to the invention with its multilayer structure has polarization-dependent color filter effects. The multilayer structure can thus be configured such that it has a polarization-dependent color filter effect. This can be used for further authentication checks. So, by means of a polarized illumination and/or upon viewing through a polarizer different color filter effects can be achieved.

The security element according to the invention is preferably configured such that the multilayer structure, viewed in plan view, is contiguous. This also applies to the individual layers of the security element. The security element can thus have, viewed in cross-section, first and second portions which respectively are constructed of the first, second and third layer which are disposed mutually offset in the direction of their height The security element according to the invention can have more than three layers. In particular, the number of layers is odd-numbered and is supplemented, in comparison to the three-layer construction, by a fourth and fifth layer by n times, where n is an integer greater than zero. The fourth layer is a dielectric layer and the fifth layer is, in the same way as the first and third layer, either a dielectric layer with a refractive index higher than the second and fourth layer or a metallic layer or a semimetallic layer. A five-layer construction is preferred, with which also those colors can be represented which lie outside the conventional color triangle.

Of course, it is possible that the security element has in certain portions a first multilayer structure with three layers and a second multilayer structure with more than three layers (for example five layers), in order to thereby produce locally different colors. Therefore, also the number of layers can be laterally varied, in order to produce the desired colors upon reflection and/or transmission.

The security element according to the invention can be configured as a reflective and/or transmissive color filter.

Further, a document of value having the security element according to the invention is provided.

The document of value according to the invention can have a polarizer. This can be employed for example for viewing the security element upon a different document of value. Further, the polarizer can be integrated in the document of value relative to the security element such that for example by bending, buckling or folding the document of value the polarizer can be positioned in such a way in front of the security element of the document of value that the security element can be viewed through the polarizer.

Furthermore, a manufacturing method of a security element for security papers, documents of value or the like is provided, upon which the upper side of a carrier is height-modulated, on the height-modulated upper side there is applied, in this order, a first layer, a second layer of dielectric material and a third layer as a multilayer structure which is thus also height-modulated, whereby for the first and third layer there is employed respectively a dielectric material with a refractive index higher than that of the second layer or respectively a metallic material or respectively a semimetallic material.

The manufacturing method according to the invention can be developed in particular such that the security element according to the invention as well as the development of the security element according to the invention can be manufactured.

For the production of the height-modulated upper side of the carrier, known methods for micro-structuring, such as e.g. embossing methods, can be used. The original structure can be produced for example with methods known from the semiconductor manufacturing (photolithography, electron beam lithography, laser lithography, etc) through a gray level exposure and through a subsequent etching process on a substrate which is coated with a resist material. Therefrom, the embossing tool is produced by galvanic molding or by a nano-imprint method e.g. in ETFE or in an inorganic-organic hybrid polymer. Such embossing tools, however, can also be written directly into a substrate by laser ablation or ultrashort laser pulses.

For the manufacturing of large areas, the known methods for embossing in thermoplastic foils or in foils coated with radiation-curing lacquers are particularly suitable.

The carrier can have one layer or several layers which are successively applied and, where appropriate, structured, and/or can be composed of several parts.

The security element can be configured in particular as a security thread, tear thread, security band, security strip, patch or as a label for the application onto a security paper, document of value or the like. In particular, the security element can span transparent regions or recesses.

The term security paper here is understood to mean in particular the precursor to a document of value yet unfit for circulation, which besides the security element of the invention can have for example also further authenticity features (such as e.g. luminescence substances provided in the volume). Documents of value here are understood to mean documents of value produced of security papers, on the one hand. On the other hand, documents of value can also be other documents and objects which can be provided with the security element of the invention, so that the documents of value have non-copyable authenticity features, thereby making possible an authenticity check and at the same time preventing undesirable copying.

It is obvious, that the above-mentioned and below still to be explained features can be used not only in the specified combinations, but also in other combinations or alone without leaving the scope of the present invention.

DESCRIPTION OF THE DRAWINGS

In the following the invention is explained in still more detail by way of example with reference to the accompanying Figures which also disclose features essential to the invention.

FIG. 8a-8c show different representations for explaining the reflective color filter effect of the security element 1 of FIG. 2;

FIG. 9a-9c show different representations for explaining the transmissive color filter effect of the security element of FIG. 2;

FIG. 12a-12c show different representations for explaining the reflective color filter effect of a security element of a still further embodiment;

FIG. 13a-13c show different representations for explaining the transmissive color filter effect of a security element of the still further embodiment;

FIG. 27-30 show representations of an embodiment of the security element having a multilayer structure of five layers with different modulation depths;

DETAILED DESCRIPTION OF PREFERRED EMBODIMENTS OF THE INVENTION

Figure 1:
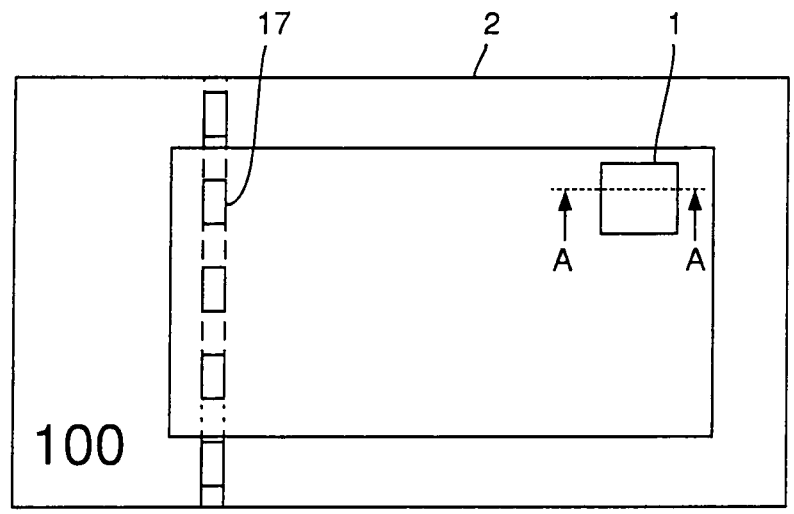
FIG. 1 shows a plan view onto a bank note having a security element according to the invention.

In the embodiment shown in FIG. 1, the security element according to the invention 1 is integrated in a bank note 2 such that the security element 1 is visible from the front of the bank note 2 shown in FIG. 1 as well as from the back of the bank note 2.

Figure 2:
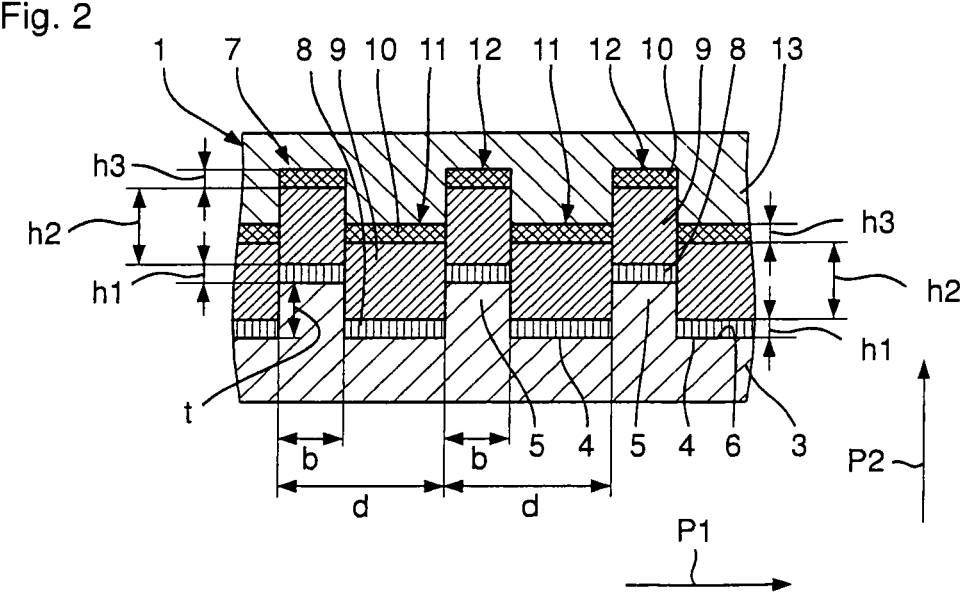
FIG. 2 shows an enlarged portion of a part of the section along the line A-A in FIG. 1.

As can be inferred from the sectional view in FIG. 2, which shows in an enlarged fashion a part of the security element 1 along the sectional line A-A of FIG. 1, the security element 1 comprises a carrier 3 in whose upper side 6 there are formed in a first direction P1 periodically disposed trenches 4 with a trench depth t. The trenches 4 are respectively spaced apart from each other by the distance b (here b=130 nm), so that between the trenches 4 there is respectively present a bar 5. The whole extent of a trench 4 and of a bar 5 in the first direction P1 is d (here d=330 nm).

The representation in FIG. 2 as well as in the following Figures is not true to scale, but for the sake of better representability chosen accordingly.

The upper side of the carrier 3 is thus height-modulated (due to the alternately disposed trenches 4 and bars 5) and in the first direction P1 can be referred to as a grating with a grating period d, whereby in the described embodiment the grating is configured as a rectangular grating.

On the height-modulated upper side 6 of the carrier 3 there is formed a multilayer structure 7 acting as a color filter, said multilayer structure having a first layer 8, a second layer 9 as well as a third layer 10, which lie on top of each other in this order. The first and third layers 8, 10 are respectively configured as a 20 nm thick, semitransparent silver layer (thus h1=h3=20 nm). The interjacent second layer is formed as an $SiO_2$ layer with a layer thickness of h2=150 nm and a refractive index of n≈1.5.

Due to the height-modulated upper side 6 the multilayer structure 7 has first portions 11 which are formed in the trenches 4 as well as second portions 12 which are formed on the bars 5, which portions are disposed mutually offset in a modulation direction P2 perpendicular to the first direction P1, in each case by the trench depth t which can also be referred to as the modulation depth. When viewed in plan view, the multilayer structure as a whole is contiguous. The same applies to the individual layers 8, 9 and 10 of the multilayer structure 7.

On the multilayer structure 7 there is formed a transparent protective layer 13.

Figure 3:
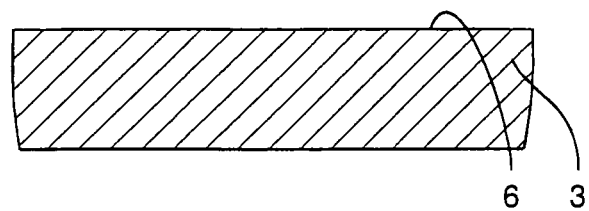
FIG. 3-7 show different sectional views for explaining the manufacturing of the security element 1 of FIG. 2.
Figure 4:
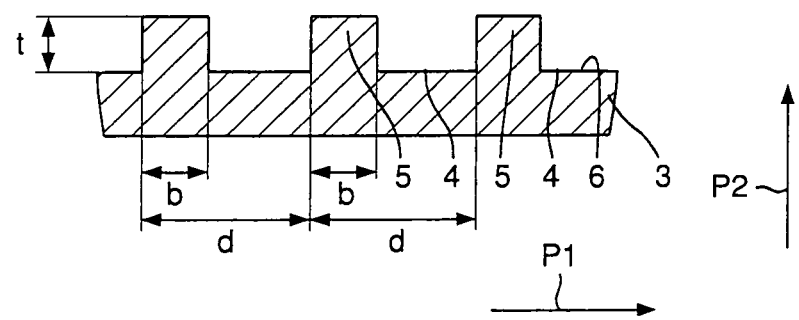
Figure 5:
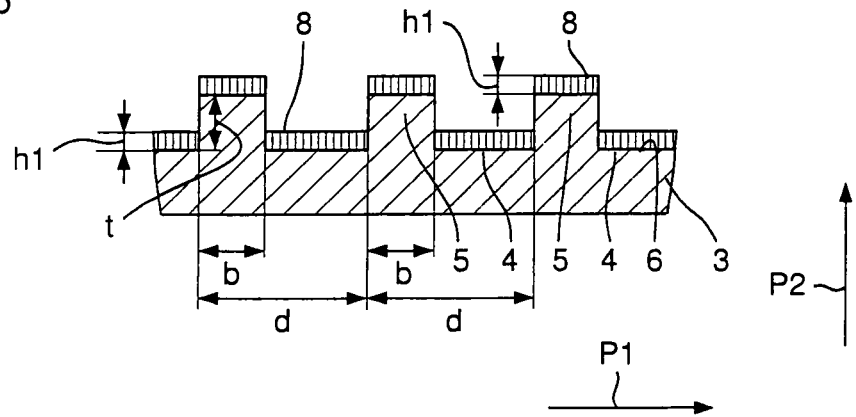
Figure 6:
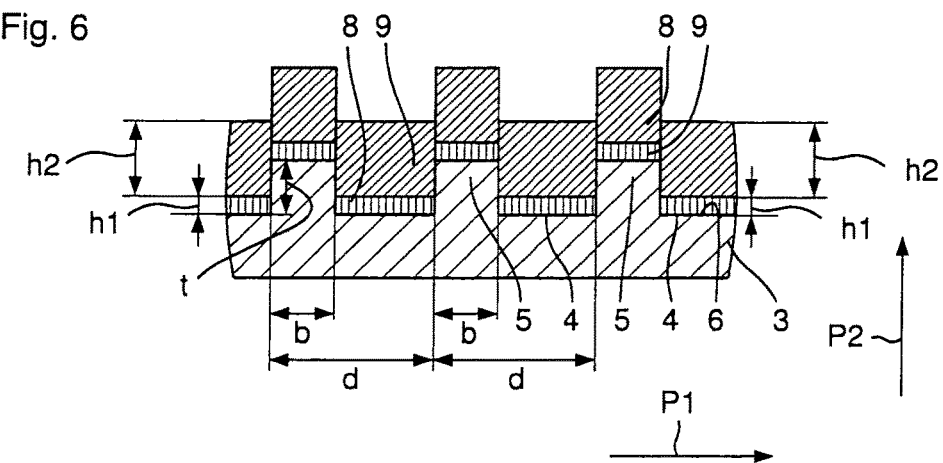
Figure 7:
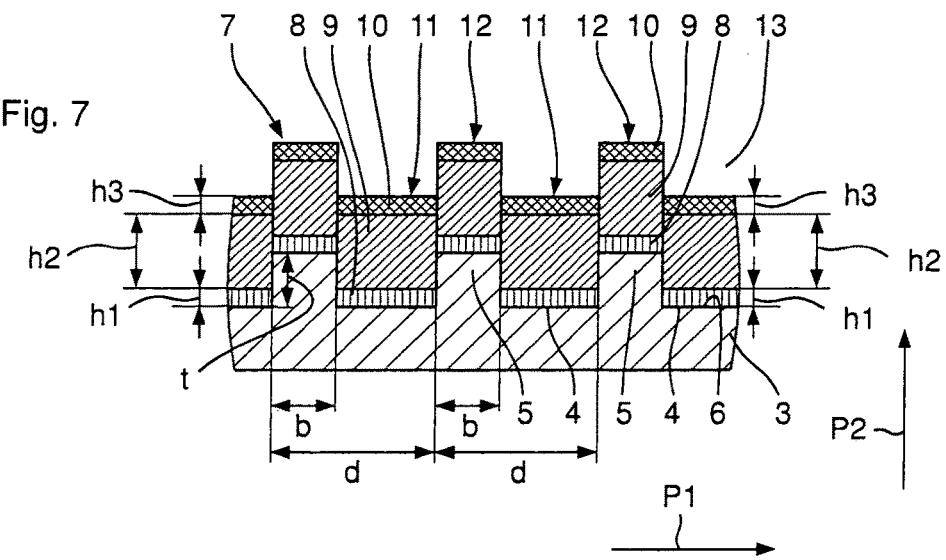

The manufacturing of the security element 1 is schematically represented in the FIGS. 3-7. First, the upper side 6 of the carrier 3, which here is a radiation-curing lacquer (e.g. an UV lacquer), is height-modulated by embossing (FIGS. 3, 4). The lacquer layer 3 can be provided e.g. on a not shown transparent carrier foil (e.g. a PET foil).

Then, the first, second and third layer (FIGS. 5-7) as well as the transparent protective layer 13 (e.g. a lacquer layer) are successively applied, so that one obtains the security element 1 of FIG. 2.

Due to the described structure, the color filter effect of the height-modulated multilayer structure 7 can be both observed in reflection and in transmission. It has been found here that the modulation depth t has a large influence on the filter effect. Through the choice of the modulation depth t one can therefore determine the color filter effect. In order to illustrate this, in the following there is described the change of the color filter effect for modulation depths t between 0 and 300 nm in connection with the FIGS. 8a-8c (for reflection) and FIGS. 9a-9c (for transmission) in each case with an angle of incidence of the light of 30°.

In the FIGS. 8a and 9a, there are respectively drawn the representable colors in the CIE standard chromaticity diagram. The black dot in the FIGS. 8a and 9a denotes the white point. The FIGS. 8b and 9b show the L value of the Lab color space in dependence on the modulation depth t, and the FIGS. 8c and 9c show the colorfulness in dependence on the modulation depth t. The colorfulness is defined here as the distance of the color value x, y from the white point.

As can be inferred from FIGS. 8a-8c and 9a-9c, a large region of the color space is passed through both in reflection and in transmission. Here, the intensities (L values in the Lab color space) are such that the colors are well perceivable even in daylight.

The security element 1 according to the invention thus acts as a color filter (in reflection or transmission) which reflects or transmits only a part of the incident white light. Here the grating period d<λ/n is preferred, whereby λ, is the largest wavelength of the predetermined wavelength range for which the security element 1 is designed, and n denotes the refractive index of the surrounding medium. The security element 1 is designed in particular for visible light (wavelength range from 380 to 780 nm), so that the present grating period d of 330 nm is smaller than the value λ/n≈520 nm for the largest wavelength. The multilayer structure 7 can therefore also be referred to as a subwavelength grating. With this grating, however, in the blue there also occurs diffraction in the first order. But the light diffraction of the zeroth order dominates. In addition, the diffraction angle for the higher orders of the blue light is very steep and is thus hardly perceived by the observer.

Figure 33:
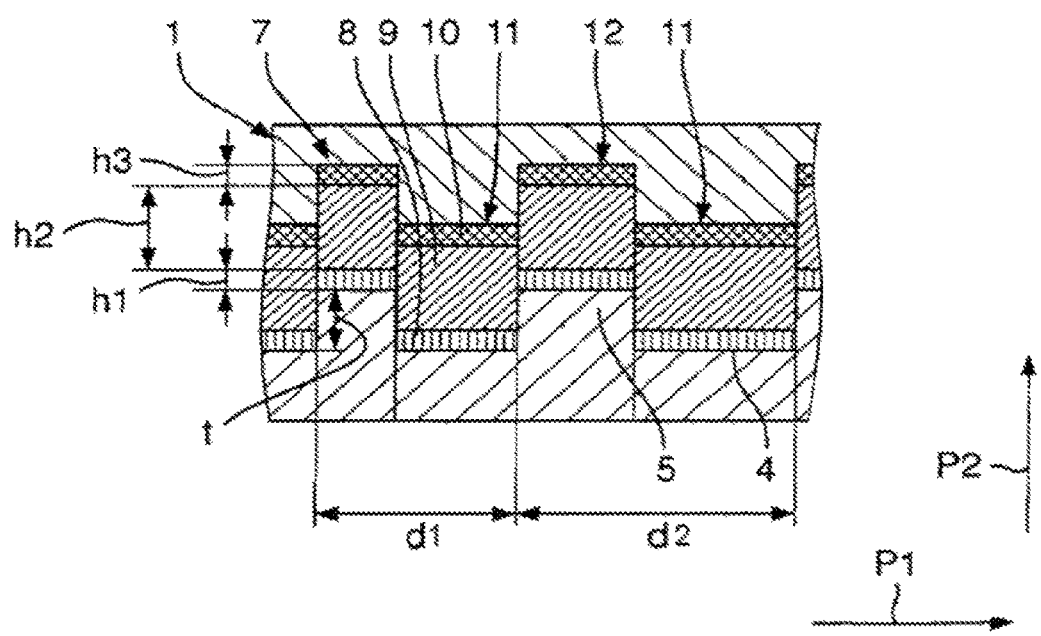
FIG. 33 shows an enlarged portion of a part of another embodiment having a laterally varied grating period.

Through the variation of the modulation depth t there can thus be represented different colors in reflection and/or transmission. Through a lateral variation of the modulation depth there can thus be represented a finely structured, multi-color motif. Further, for setting the desired colors, also the grating period can be laterally varied, as shown in FIG. 33 with laterally varying grating periods d1 and d2. It is only necessary to locally set the corresponding modulation depth which corresponds to the desired color at this location. The such represented motif can be letters, numbers, texts, pictures or other graphic representations. With the security element of the invention there can thus be produced very finely structured multi-color motifs which are extremely difficult to copy.

Figure 10A:
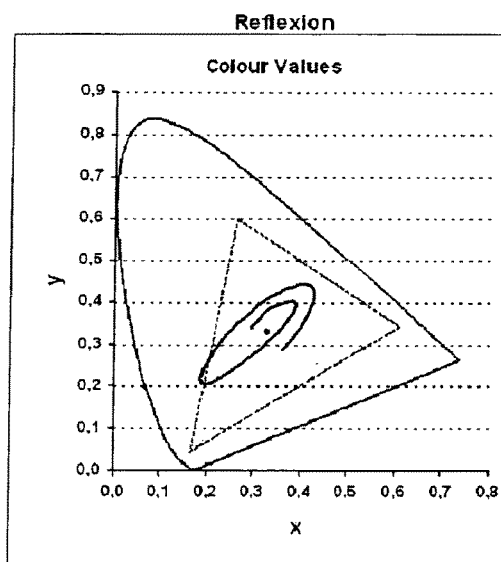
FIG. 10a-10c show different representations for explaining the reflective color filter effect of a further security element.
Figure 10B:
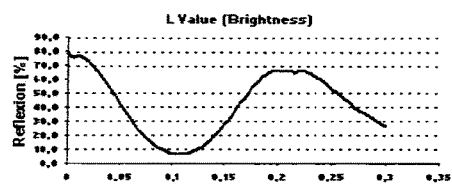
Figure 10C:
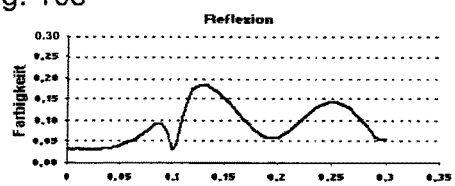

In a further embodiment, which differs from the embodiment of FIG. 2 only in that the first and third layers 8, 10 are respectively formed of aluminum with a layer thickness h1=h3=10 nm and the second layer is formed of $SiO_2$ with a layer thickness h2=200 nm, a slightly larger region of the color space can be covered in reflection, as can be inferred from FIGS. 10a-10c. FIGS. 10a-10c are the representations corresponding to the FIGS. 8a-8c.

Figure 11A:
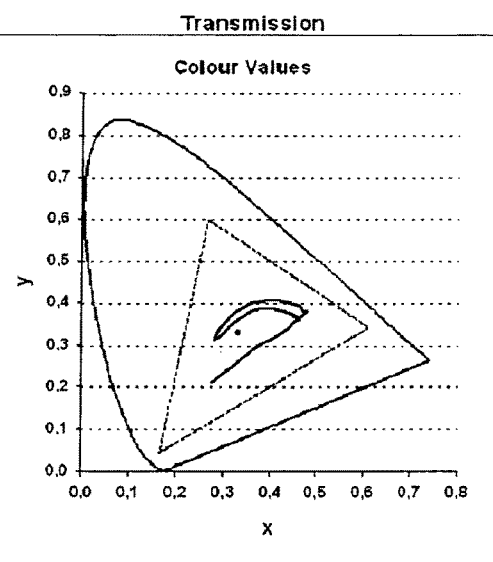
FIG. 11a-11c show different representations for explaining the transmissive color filter effect of the further security element.
Figure 11B:
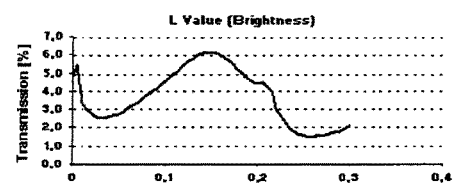
Figure 11C:
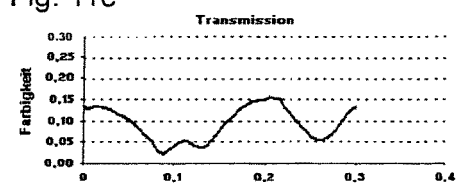

However, the transmission, even with the chosen layer thickness of 10 nm for h1 and h3, is no longer very pronounced, as can be inferred from FIGS. 11a-11c which are the Figures corresponding to FIGS. 9a-9c. Diminishing the thicknesses h1 and h3 to 5 nm would increase the transmission approximately by a factor four, but then also the coverage of the color space in transmission would be diminished.

The first and third layer 8, 10 need not be formed of a metallic material, but can also be formed of a semimetallic material, such as silicon or germanium, or of dielectric materials whose refractive index is higher than the refractive index of the dielectric material of the second layer 9. For example, unlike the embodiment of FIG. 2, the first and third layer 8, 10 can be formed of ZnS, whereby h1=100 nm and h3=60 nm. The dielectric layer is a $SiO_2$ layer with a thickness h2=80 nm. The remaining dimensions correspond to those in the embodiment of FIG. 2. In a security element 1 with a purely dielectric layer structure there is present a large color coverage upon reflection (FIGS. 12a-12c). In transmission, however, the color properties are only weakly pronounced, as can be inferred from FIGS. 13a-13c. Therefore, a purely dielectric layer structure is preferably viewed against a black background.

Figure 14:
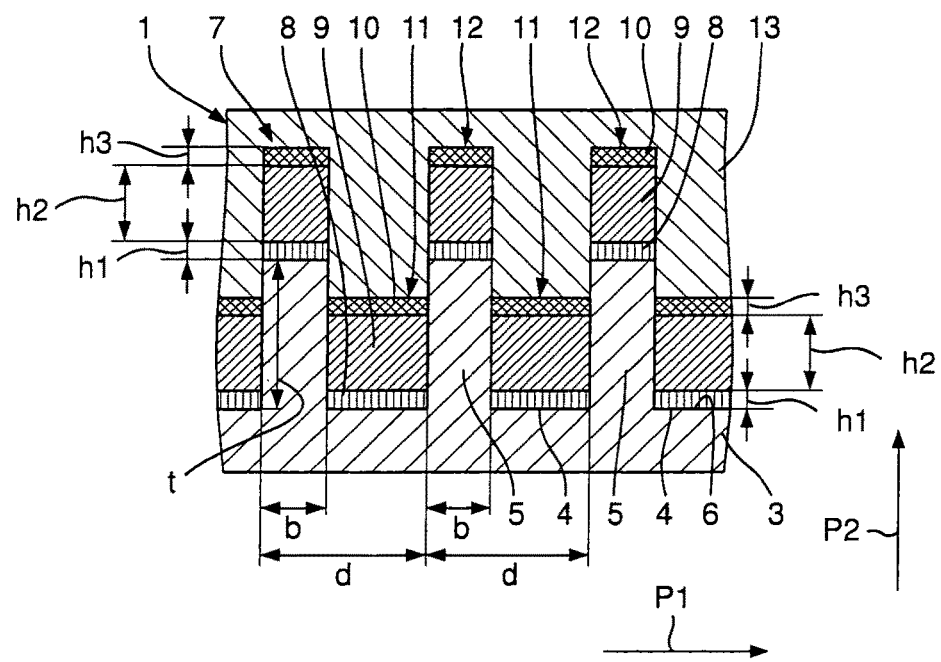
FIGS. 14 and 15 show the security element according to FIG. 2 with different modulation depths.

In the representations of FIGS. 8-13, the modulation depth t was respectively varied between 0 and 300 nm. This leads to the fact that besides the offset of the first and second portions 11 and 12 in modulation direction P2, shown in FIG. 2, the offset may be so large that the bottom side of the first layer 8 in the second portions 12 lies above the upper side of the third layer 10 in the first portions 11, as represented in FIG. 14. When viewed in a plan view, both the multilayer structure 7 and the individual layers 8 through 10 are still contiguous.

Figure 15:
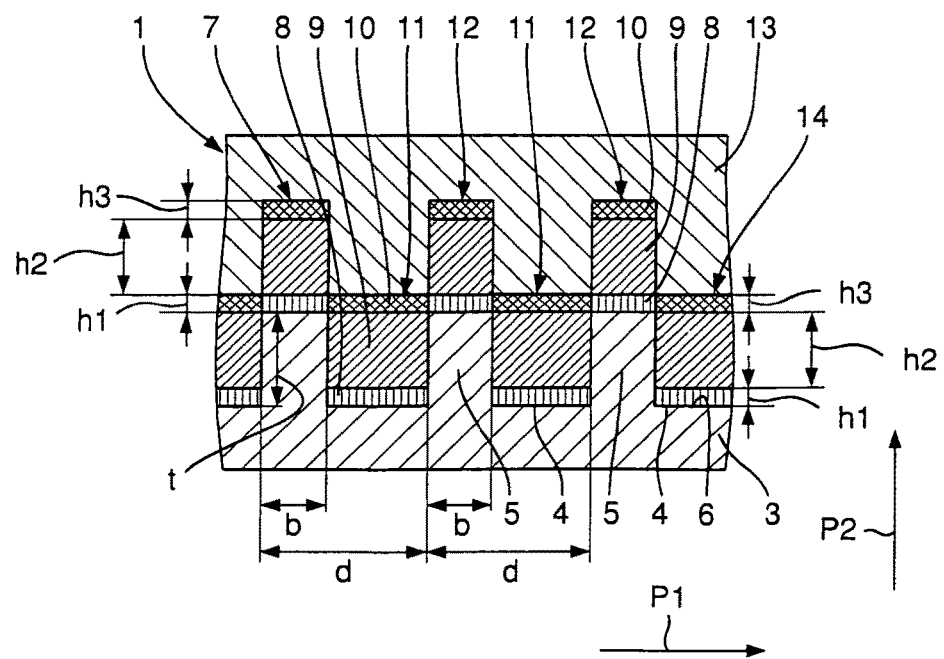

A special case occurs when the modulation depth t is chosen such that it is equal to the sum of the layer thicknesses h1 and h2. The result of this is that the first layer 8 of the second portions 12 as well as the third layer 10 of the first portions 11 form a closed film 14, and the first layer 8 in the first portions 11 below the closed film 14 as well as the third layer 10 of the second portions 12 above the closed film 14 respectively form a wire grating, as this is represented in FIG. 15.

The closed film 14 has a constant thickness, when h1 is equal to h3. When h1 is not equal to h3, the thickness of the film varies periodically (with period d).

The color filter properties of the security element 1 of the invention can be caused by various effects, such as e.g. the Wood's anomaly, in which a part of the visible spectrum is diffracted in the first order and therefore is missing in the zeroth diffraction order upon reflection or transmission. This effect is nearly independent of the polarization of the light.

Further, through light with TM polarization, surface plasmon polaritons can be excited, which leads to a selective absorption upon diminished transmission.

Plasma resonances may occur at the very thin metal layers 8, 10, which leads to a selective absorption and an increased transmission. The resonance wavelength depends on the metal and is independent of the polarization.

Furthermore, there may occur Fabry-Perot resonances between the thin metal layers 8, 10, whereby the resonance wavelength depends on the distance h2 of the two metal layers 8, 10.

There may also occur cavity resonances in the grating trenches 4 (upon TM polarization), whereby the resonance wavelength depends on the trench depth t.

Furthermore, there may occur resonances in TE polarization, whereby the resonance wavelength is dependent on the width of the grating trenches 4.

Finally, in a purely dielectric construction of the multilayer structure 7 (three dielectric layers 8-10) there may be present an interference between the low refractive layer 9 and the high refractive dielectric layers 8, 10.

All of these effects can contribute to the coloring in the described multilayer structures 7. But the main contributions come from the Fabry-Perot resonances between the thin metal layers, when the first and third layers 8, 10 are formed of metal or semimetal, or from the interferences between the first and third layer 8, 10, when these are formed as dielectric layers with a refractive index higher than the dielectric second layer 9.

Figure 16:
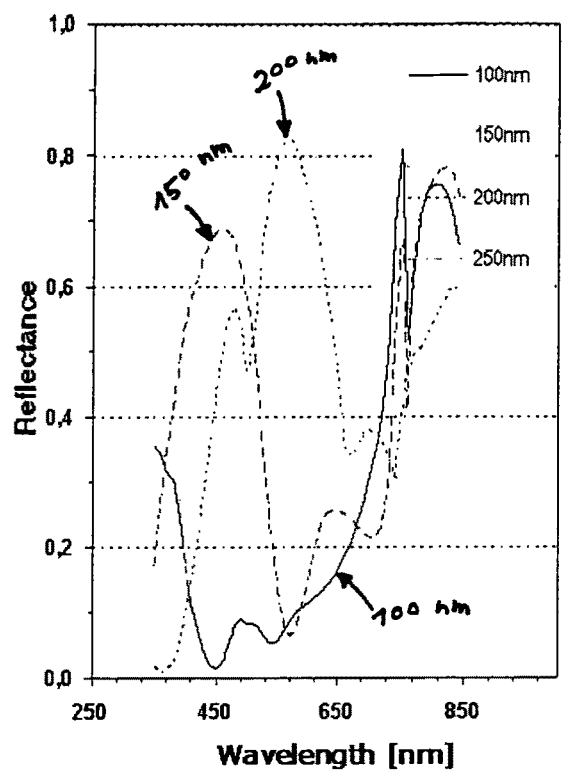
FIG. 16 shows reflection spectra of the security element according to variant 1.
Figure 17:
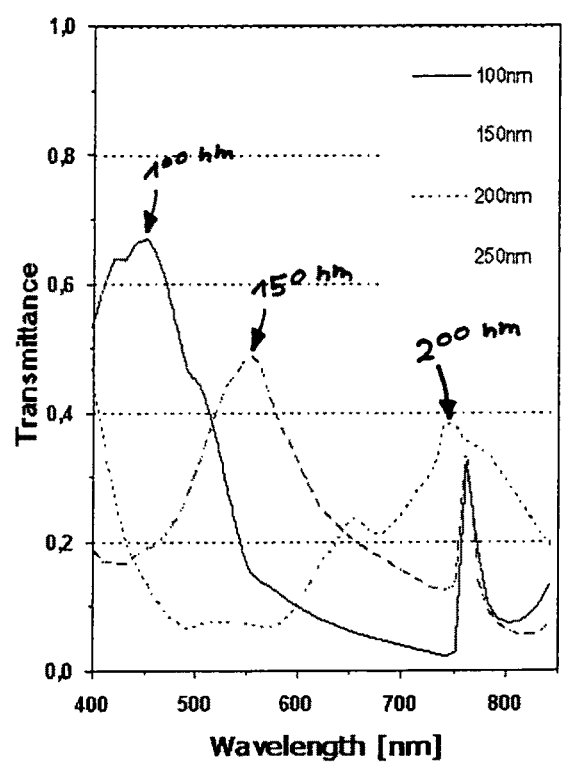
FIG. 17 shows transmission spectra of the security element according to variant 1.

FIGS. 16 and 17 show the reflection and transmission spectra for a multilayer structure 7, in which the first and third layer 8, 10 is configured as a silver layer with a layer thickness h1=h3=20 nm, whereby the modulation depth t is 100, 150, 200 and 250 nm. For each of these modulation depths the layer thickness h2 of the dielectric second layer 9, which is a $SiO_2$ layer, here is chosen such that h1+h2=t is fulfilled, and hence the closed metal film 14 according to FIG. 15 is present. The values for b and d are 130 nm and 330 nm, respectively. A security element 1 with such a multilayer structure 7 is referred to in the following also as security element according to variant 1.

From the spectra according to 16 and 17, which show the reflection or transmission behavior for an angle of incidence of the light of 30°, it is apparent that with increasing thickness h2 or with increasing modulation depth t the resonance shifts into the longwave range.

Figure 18:
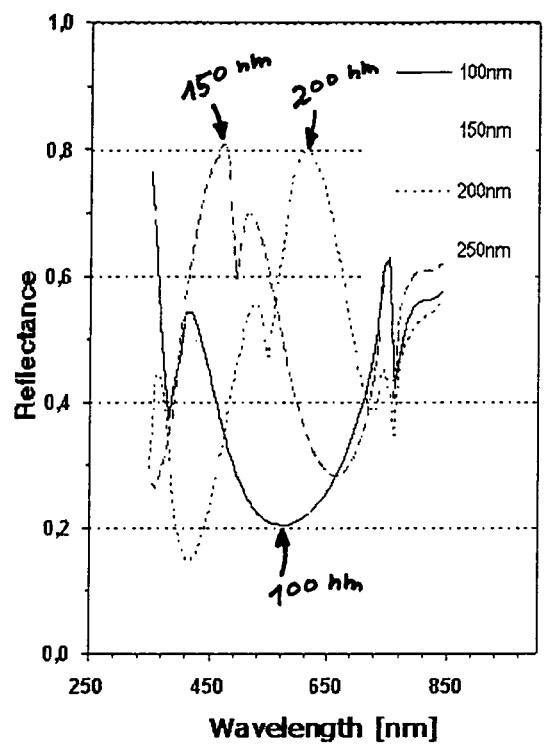
FIG. 18 shows reflection spectra of the security element according to variant 2.
Figure 19:
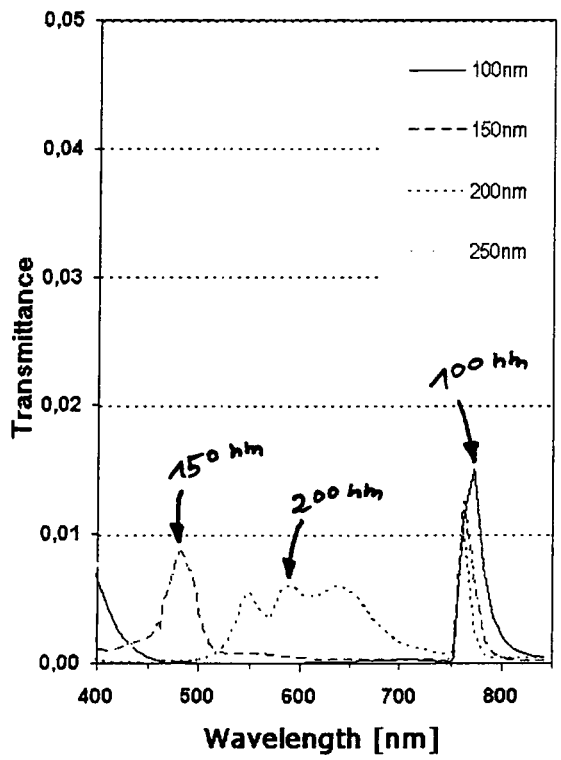
FIG. 19 shows transmission spectra of the security element according to variant 2.

The same behavior is shown in FIGS. 18 and 19, which show, in the same way as the FIGS. 16 and 17, the reflection and transmission spectra for an angle of incidence of the light of 30° upon a multilayer structure 7, in which the first and third layer 8, 10 is respectively configured as an aluminum layer with a thickness of 30 nm. The second layer again is a $SiO_2$ layer, whose thickness is 100, 150, 200, 250 nm. Here, too, the modulation depth t has been respectively chosen such that h1+h2=t applies, so that the closed film 14 is present. The values for b and d are 130 nm and 330 nm, respectively. A security element 1 with such a multilayer structure 7 is referred to in the following also as security element according to variant 2.

Figure 20:
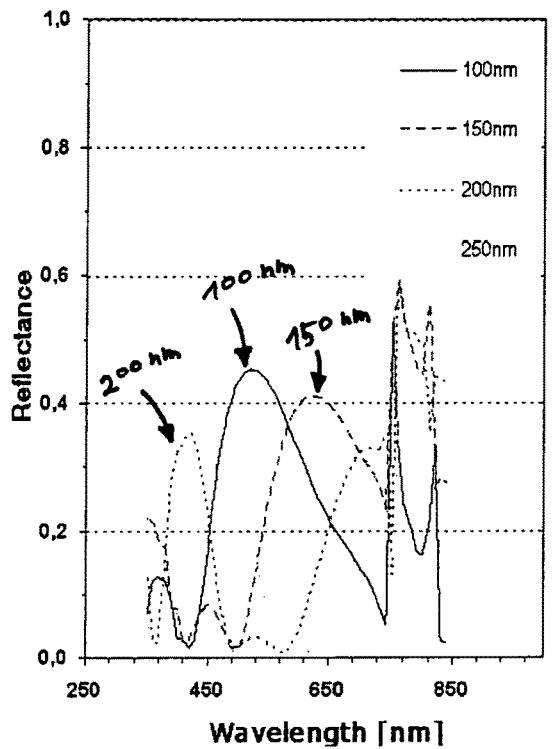
FIG. 20 shows reflection spectra of the security element according to variant 3.
Figure 21:
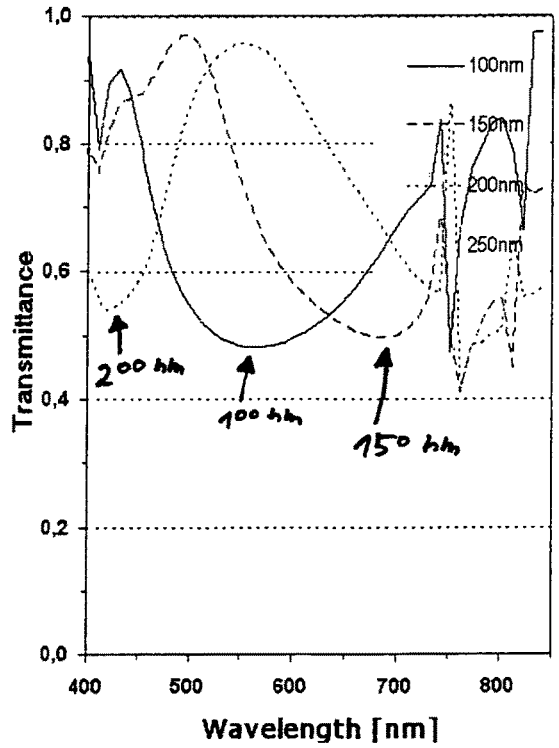
FIG. 21 shows transmission spectra of the security element according to variant 3.

Also in the event that the multilayer structure 7 is formed of three dielectric layers, a same behavior can be observed. As can be inferred from FIGS. 20 and 21, upon a multilayer structure 7 in which the first and third layers are respectively configured as a ZnS layer with a thickness of 70 nm and the second layer as a $SiO_2$ layer, it is to be observed that the resonance shifts into the longwave range with increasing thickness of the second layer or with increasing modulation depth t. Also in the FIGS. 20 and 21 there are drawn, in the same way as in the FIGS. 16 and 17, the reflection and transmission spectra for the thicknesses h2 of the second layer of 100, 150, 200 and 250 nm, whereby here, too, the modulation depth t is respectively chosen such that h1+h2=t is fulfilled. The values for b and d are 130 nm and 330 nm, respectively. A security element 1 with such a multilayer structure 7 is referred to in the following also as security element according to variant 3.

Figure 22:
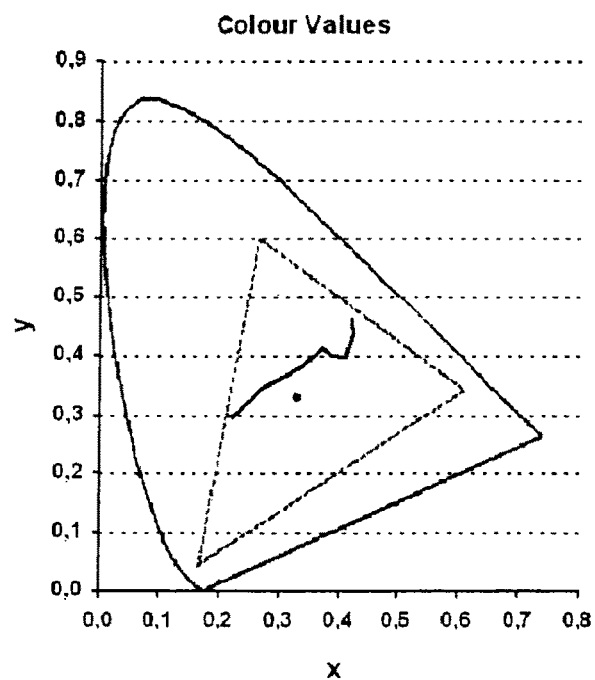
FIG. 22 shows a representation for explaining the angle dependence of the colors upon reflection of the security element according to variant 1.
Figure 23:
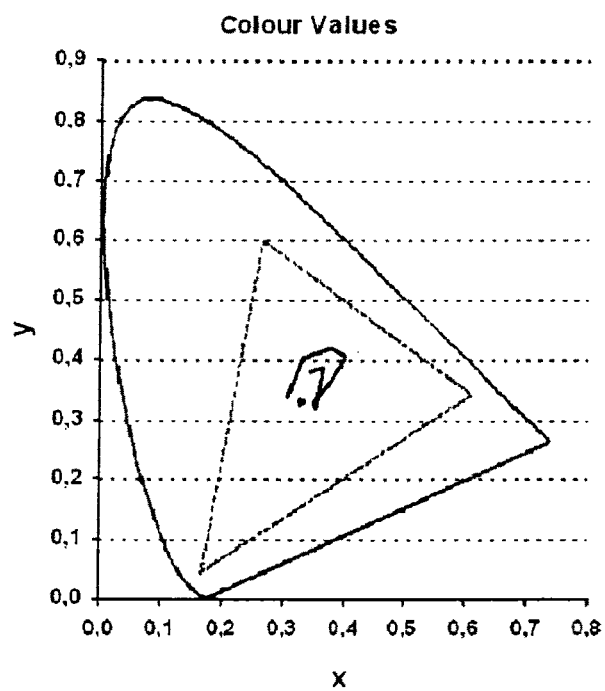
FIG. 23 shows a representation of the angle dependence the colors upon reflection of the security element according to variant 2.

In FIG. 22 there is represented the angle dependence of the colors upon reflection according to the multilayer structure of variant 1 with h2=200 nm for the angle of incidence of the light of 0 to 45°. In FIG. 23, there is shown the same representation for the multilayer structure according to variant 2 with h2=200 nm. From these representations it can be inferred, that even upon a uniform illumination for the angle range from 0° to 45°, there occurs a color filter effect upon reflection. That is, the color effect according to the invention is not levelled off through a diffuse or convergent illumination, but is still clearly visible.

Figure 24A:
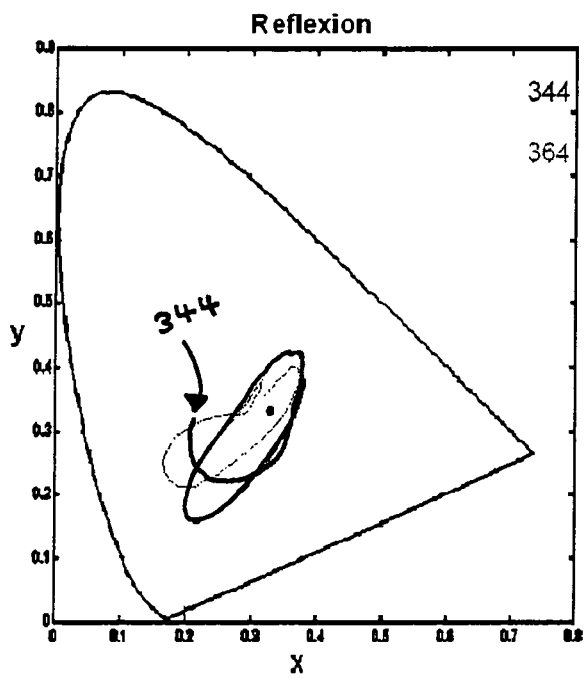
FIG. 24a-24c show representation for explaining the color filter effect upon reflection of the security element according to variant 3 for different angles of incidence.
Figure 24B:
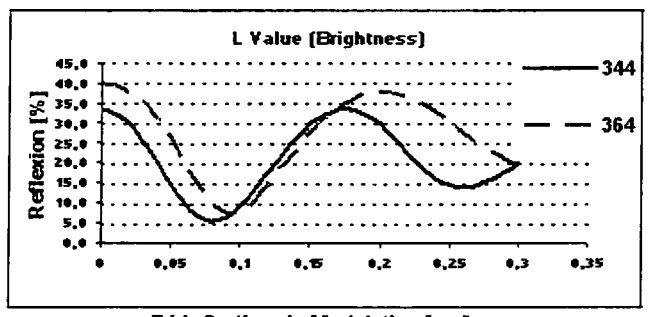
Figure 24C:
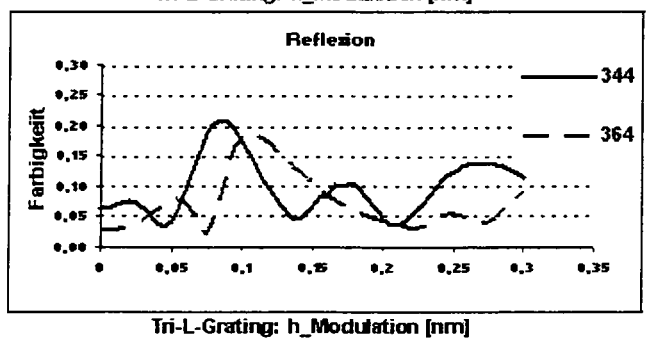

In the FIGS. 24a-24c there is shown the reflection of the multilayer structure according to variant 3 for the angle of incidence of 0° and 60° for modulation depths t between 0 and 300 nm. The representation in the FIGS. 24a-24c substantially corresponds to the representation in the FIGS. 8a-8c. From the diagram according to FIG. 24c there can be inferred that for a wide range of the modulation depth t the same color is produced. Thus, suitable modulation depths t can be chosen, upon which the colors show in reflection a very low angle dependence. In the FIGS. 24a-24c the numbers "344" and "364" respectively denote the results for an angle of incidence of 30° or 60°.

Additionally, polarizing properties of the security element can be used for the authenticity detection. The resonances in the spectrum shown in the FIGS. 16-21 are differently pronounced for TM and TE polarization. A part of the resonances only occurs upon TM polarization, a different part only upon TE polarization. Therefore, upon illumination with polarized light or upon viewing with a polarizer, there are perceived different colors in dependence on the polarization direction.

Figure 25A:
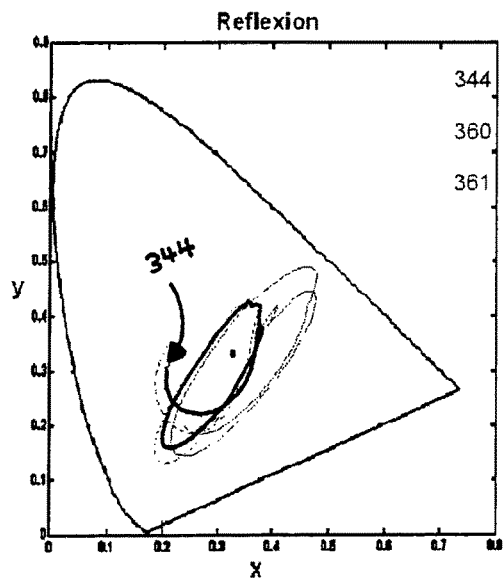
FIG. 25a-25c show representation for explaining the polarization-dependent color filter effect upon reflection of the security element according to variant 3.
Figure 26A:
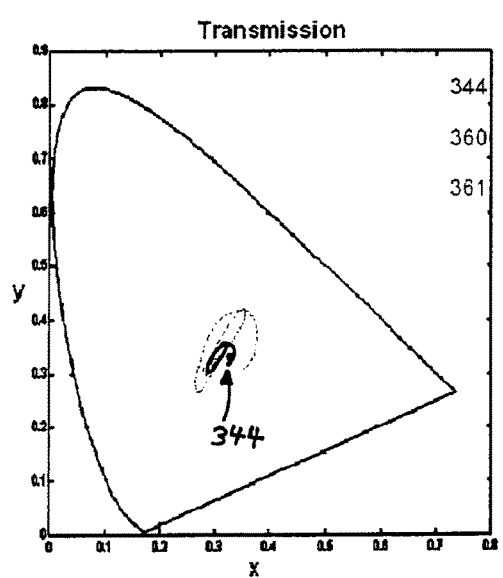
FIG. 26a-26c show representation for explaining the polarization-dependent color filter effects upon transmission of the security element according to variant 3.
Figure 25B:
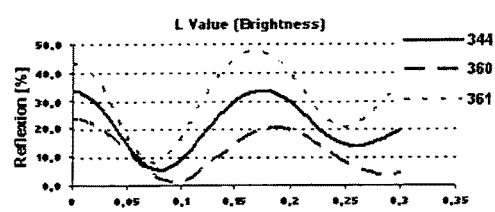
Figure 26B:
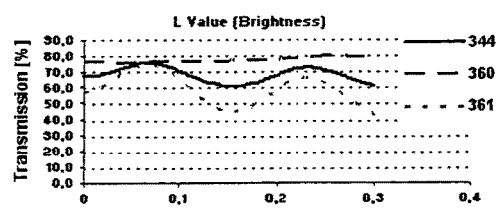
Figure 25C:
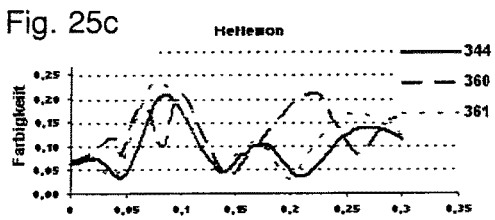
Figure 26C:
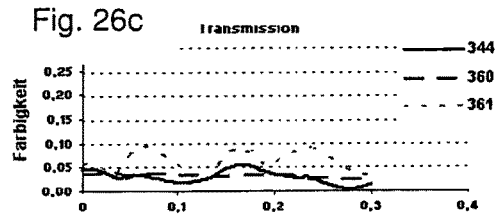

The polarization-dependent color impressions of the multilayer structure 7 according to variant 3 are represented in the FIGS. 25a-25c for reflection and in the FIGS. 26a-26c for transmission, in each case for an angle of incidence of the light of 30°. From these representations it can be inferred, that the color change is particularly pronounced upon a change from TM to TE polarization for the modulation depths of t approximately 80 nm and t approximately 210 nm. In the FIGS. 25a-25c the number "344" denotes the state without polarization and the numbers "360" and "361" respectively denote the states with TM polarization or TE polarization.

Figure 27:
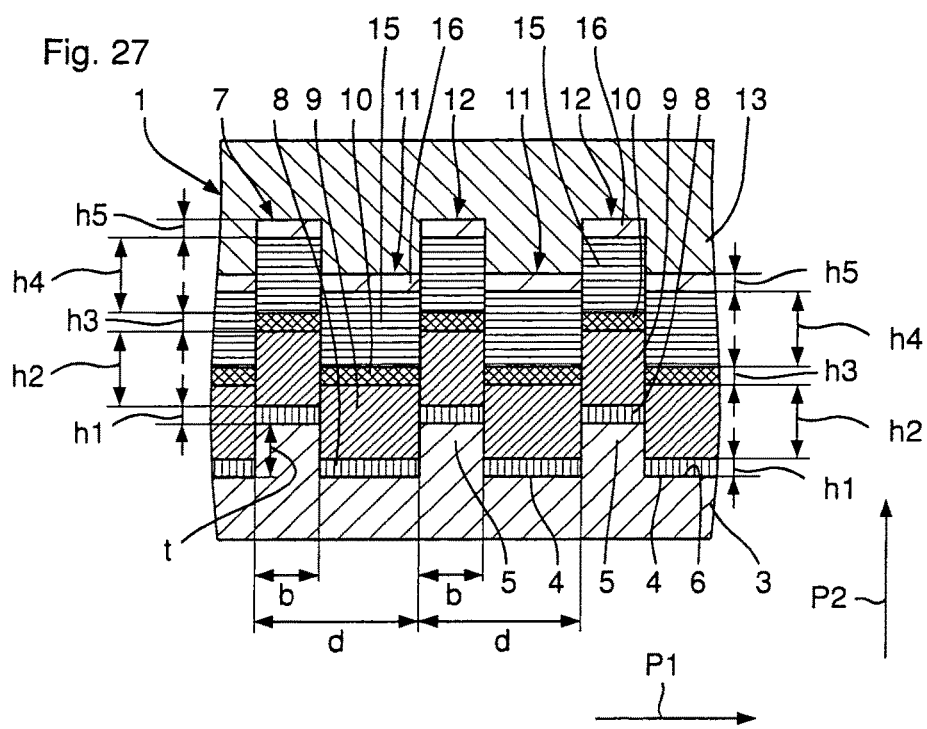

Of course, the multilayer structure 7 can comprise more than three layers. In FIG. 27 there is represented a multilayer structure 7 with five layers, which can also be referred to as a penta structure 7. The additional fourth layer 15 is, compared to the embodiment of FIG. 2, a dielectric layer which here is formed of the same material as the second layer 9. The additional fifth layer 16 is a metal layer, which here is respectively formed of silver in the same way as the first and third layer 8, 10. The layer thicknesses h1, h3 and h5 are equal and are 15 nm. The thicknesses h2 and h4 are also equal and are 100 nm, whereby ZnS is used as a material. The values for b and d are 130 nm and 330 nm, respectively.

Figure 28:
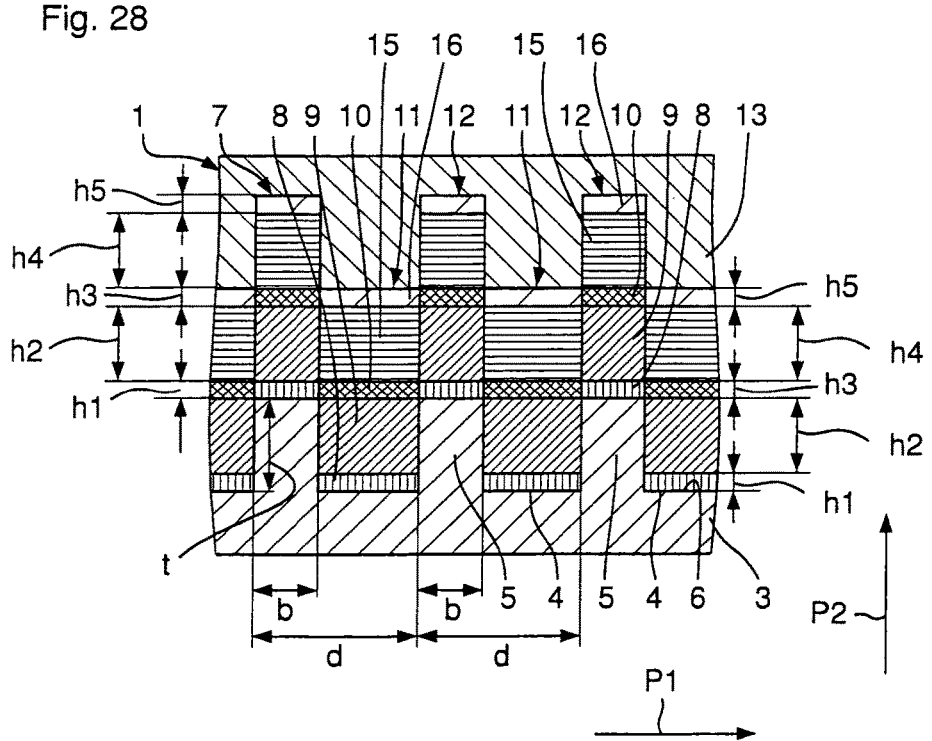

As can be inferred from FIGS. 28 to 30, there can be present, in dependence on the modulation depth t, two (FIG. 28) or one (FIG. 29) continuous metal layer. In FIG. 30 there is shown an embodiment, in which the modulation depth t is larger than the layer thickness (=h1+h2+h3+h4+h5) of the multilayer structure 7.

Figure 31A:
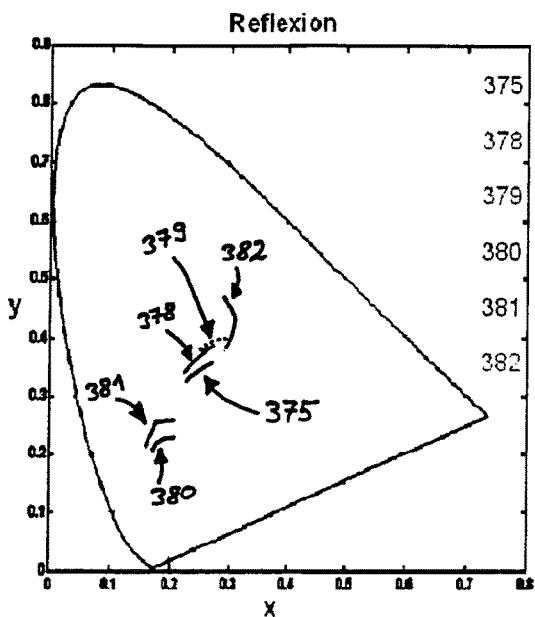
FIG. 31a-31c show different representations for explaining the reflection behavior of a security element having a multilayer structure with five layers.
Figure 31B:
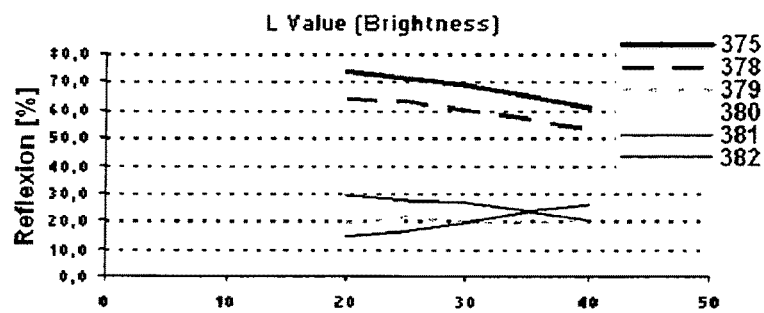
Figure 31C:
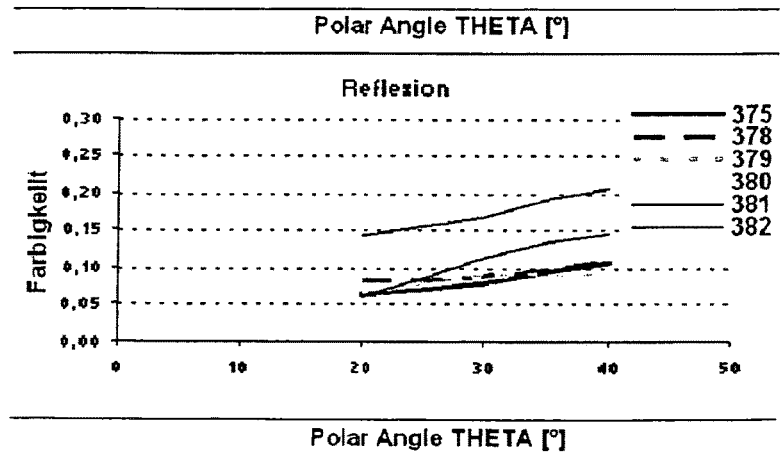

In FIGS. 31a-31c there is represented the reflection behavior of the penta structure 7 for different modulation depths t (0 nm, 15 nm, 40 nm, 115 nm, 130 nm, and 230 nm) in dependence on the angle of incidence for the range of 20°-40°. Different modulation depths t therefore show different colors in reflection. In the FIGS. 31a-31c the numbers "375", "378", "379", "380", "381" and "382" respectively denote the modulation depths 0 nm, 15 nm, 40 nm, 115 nm, 130 nm and 230 nm.

Figure 32:
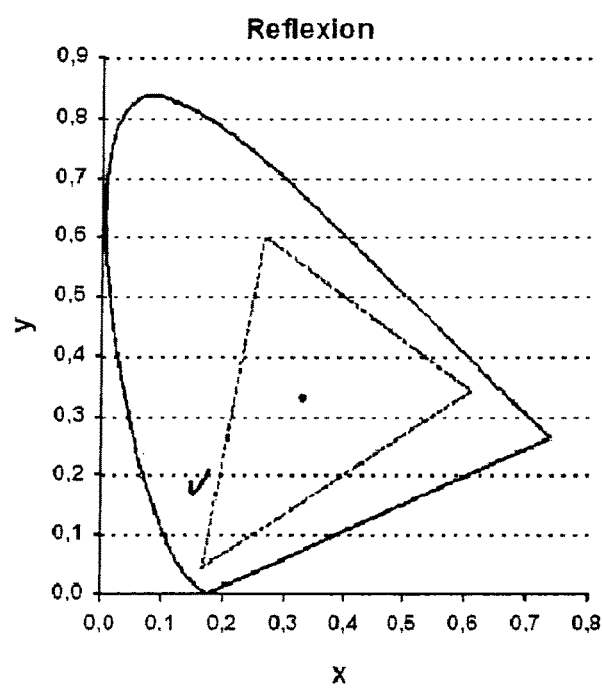
FIG. 32 shows a representation of the reflective filter effect of a security element having a purely dielectric multilayer structure with five layers.

In FIG. 32 there is shown in a CIE standard chromaticity diagram the reflection of a penta structure 7, in which the metal layers 8, 10 and 16 are respectively formed of silver with a thickness of 15 nm and the dielectric layers 9 and 15 of $TiO_2$ with a thickness of 70 nm. The modulation depth t is 100 nm, and the values for b and d are 130 nm and 330 nm, respectively. The reflection behavior is represented in FIG. 32 as a function of the angle of incidence of the light for the range of 20°-40°. With such a construction there can be produced a blue color tone which lies outside the color triangle which comprises colors that can be displayed by conventional screens.

The formation of the multilayer structure as a penta structure thus shows pronounced colors in reflection and transmission. With certain geometries there can even be achieved colors with a larger saturation (distance from the white point) than with multilayer structures 7 which are composed of only three layers. So, for example with a five-layer multilayer structure 7, in which as metal layers there are respectively used 15 nm thick silver layers and as dielectric layers respectively 32 nm thick ZnS layers, the representation of a rich gold color is possible. In particular, with the penta structures 7 it is possible to produce colors which lie outside the color triangle.

Upon the formation of the multilayer structure 7 with five layers there can be realized a purely dielectric layer structure, in which alternating high and low refractive dielectric layers are disposed on top of each other.

It should be noted, however, that with the three-layer construction of the multilayer structure 7 the color space to be covered through the variation of the modulation depth t tends to be larger than with five-layer multilayer structures 7. Of course, also the manufacturing of a multilayer structure with only three layers is easier than with five layers.

Further, with the multilayer structure 7 it is possible to form the metal layers or the high refractive dielectric layers 8, 10, 16 of different materials. E.g. the first layer 8 can be a 11 nm thick copper layer, the dielectric layer a $SiO_2$ layer with a thickness of 380 nm and the third layer 10 a 60 nm thick aluminum layer. The following layer sequences are also possible:

12 nm Ag/190 nm ZnS/60 nm Al
7 nm Cr/380 nm SiO$_2$/60 nm Al;
11 nm Cu/380 nm SiO$_2$/300 nm Al

As metals there can be used preferably aluminum, gold, silver, copper, palladium, chromium, nickel, and/or tungsten as well as their alloys. As a material for the dielectric layers there can be used e.g. ZnS, SiO$_2$, TiO$_2$, MgF$_2$.

The security element 1 according to the invention for example can be combined with a moth-eye structure or any other black, absorbent structure in such a way that it is surrounded by this structure. This leads to a particularly good contrast of the motif represented by the security element 1 against the black background. Of course, it is also possible to form the carrier 3 on such a black, absorbing structure, so that the entire security element 1 is positioned against a black background. With this, a very good contrast upon reflection is achieved. It is possible for example to form conical nanostructures, so that the desired black absorbing effect is achieved.

With purely dielectric multilayer structures 7 there is achieved the advantage that these are particularly difficult to forge, since the profile of such a structure is still more difficult to ascertain than that of metallic structures. With purely dielectric structures, it is very difficult to produce cross sectional images with a scanning electron microscope.

Further, it is possible to incorporate metallic nanoparticles (such as e.g. Ag nanoparticles) into the dielectric layer 9 and/or 15. This leads to changed colors upon reflection and transmission, compared to a multilayer structure 7 of the same construction but without nanoparticles. The nanoparticles can be configured e.g. such as described in WO 2009/083151 A1.

The effect of the nanoparticles is particularly large, when the multilayer structure has a purely dielectric layer structure, such as e.g. a multilayer structure with ZnS—SiO$_2$—ZnS.

Furthermore, the color filter effect is also present for two-dimensional periodic gratings. Here, the periodicity of the second dimension direction can also extend obliquely to the first dimension direction.

The multilayer structure 7 can be laterally varied in a very fine manner, so that the color changes within micrometers. This structure is therefore suitable preferably for the coloring in micro-concave mirror arrangements and/or microlens arrangements. In particular, with the micro-concave mirrors and/or microlenses there can be realized magnification arrangements, such as modulo magnification arrangements or moire magnification arrangements. These arrangements can still represent colored motifs or images in an up to 1000-fold magnification in extremely fine resolution. The basic principle of such a modulo magnification arrangement is described for example in WO 2009/00528 A1. The basic principle of a moiré magnification arrangement is described for example in WO 2006/087138 A1.

The security element according to the invention can also be configured as a security thread 17, as indicated in FIG. 1. The security thread 17 is integrated in the bank note 2 preferably such that it can be viewed at least in certain portions from the front and/or the back of the bank note.

LIST OF REFERENCE NUMBERS 1 security element
2 bank note
3 carrier
4 trench
5 bar
6 upper side
7 multilayer structure
8 first layer
9 second layer
10 third layer
11 first portions
12 second portions
13 film
14 closed film
15 fourth layer
16 fifth layer
17 security thread
t trench depth, modulation depth
b distance
P1 1. direction
P2 modulation direction
d grating

The invention claimed is:

1. A security element for security papers, comprising:
a carrier having an upper side, said upper side being height-modulated with trenches periodically disposed in a first direction, each of the trenches having a trench depth (t);
a multilayer structure acting as a color filter, said multilayer structure being formed on the height-modulated upper side and being height-modulated;
said multilayer structure comprising a first layer, a second layer of dielectric material formed thereon, and a third layer formed on the second layer;
the trench depth (t) being greater than a thickness of the third layer;
the first and third layers each being formed of metallic material or semimetallic material;
wherein at least one or more of (a), (b), (c), (d), and (e) below are satisfied:
(a) a subwavelength grating period of the height-modulated multilayer structure is configured to cause a color change in the multilayer structure by the subwavelength grating period being laterally-varied from a first lateral position to a second lateral position within the multilayer structure of the security element;
(b) a grating profile of the height modulations of the of the height-modulated multilayer structure is laterally varied from a first lateral position to a second lateral position within the multilayer structure of the security element;
(c) metallic nanoparticles are incorporated in the second layer, and a distribution of the nanoparticles is laterally varied from a first lateral position to a second lateral position within the multilayer structure of the security element causing the color filter effect of the multilayer structure to vary laterally;
(d) a modulation depth of the height-modulated multilayer structure is laterally varied from a first lateral position to a second lateral position within the multilayer structure of the security element; or
(e) a layer thickness of the second layer is laterally varied from a first lateral position to a second lateral position within the multilayer structure of the security element,
wherein the layer thickness of the second layer is laterally varied.

2. The security element according to claim 1, wherein a height modulation of the upper side and of the multilayer structure is periodic in a first direction.

3. The security element according to claim 2, wherein the height modulation of the upper side and of the multilayer structure is additionally periodic in a second direction.

4. The security element according to claim 2, wherein the subwavelength grating period of the height-modulated multilayer structure is smaller than a largest wavelength of a range of electromagnetic radiation for which the security element is designed.

5. The security element according to claim 2, wherein the grating profile of the height-modulated multilayer structure is rectangular.

6. The security element according to claim 2, wherein the subwavelength grating period of the height-modulated multilayer structure is laterally varied.

7. The security element according to claim 2, wherein the grating profile of the height modulation is laterally varied.

8. The security element according to claim 1, wherein the metallic nanoparticles are incorporated in the second layer.

9. The security element according to claim 8, wherein the distribution of the nanoparticles is laterally varied causing the color filter effect of the multilayer structure to vary laterally.

10. The security element according to claim 1, wherein the modulation depth of the height-modulated multilayer structure is laterally varied.

11. The security element according to claim 1, wherein the multilayer structure, viewed in plan view, is contiguous.

12. A document of value comprising the security element recited in claim 1.

13. The security element according to claim 1, wherein the trench depth (t) is equal to or greater than a sum of a thickness of the first layer and a thickness of the second layer.

14. The security element according to claim 1, wherein the trench depth (t) is equal to a sum of a thickness of the first layer and a thickness of the second layer and portions of the first layer and portions of the third layer form a closed film.

15. A security element for security papers, comprising:
a carrier having an upper side, said upper side being height-modulated with trenches periodically disposed in a first direction, each of the trenches having a trench depth (t);
a multilayer structure acting as a color filter, said multilayer structure being formed on the height-modulated upper side and being height-modulated;
said multilayer structure comprising a first layer, a second layer of dielectric material formed thereon, and a third layer formed on the second layer;
the trench depth (t) being greater than a thickness of the third layer;
the first and third layers each being formed of metallic material or semimetallic material:
wherein at least one or more of (a), (b), (c), (d), and (e) below are satisfied:
(a) a subwavelength grating period of the height-modulated multilayer structure is configured to cause a color change in the multilayer structure by the subwavelength grating period being laterally-varied from a first lateral position to a second lateral position within the multilayer structure of the security element;
(b) a grating profile of the height modulations of the of the height-modulated multilayer structure is laterally varied from a first lateral position to a second lateral position within the multilayer structure of the security element;
(c) metallic nanoparticles are incorporated in the second layer, and a distribution of the nanoparticles is laterally varied from a first lateral position to a second lateral position within the multilayer structure of the security element causing the color filter effect of the multilayer structure to vary laterally;
(d) a modulation depth of the height-modulated multilayer structure is laterally varied from a first lateral position to a second lateral position within the multilayer structure of the security element; or
(e) a layer thickness of the second layer is laterally varied from a first lateral position to a second lateral position within the multilayer structure of the security element,
wherein the multilayer structure has a fourth and a fifth layer;
the fourth layer being formed on the third layer and comprising a dielectric material; and
the fifth layer being formed on the fourth layer, the fifth layer being formed of a dielectric material having a refractive index higher than that of the second layer and the forth layer, a metallic material, or a semimetallic material.

16. A security element for security papers, comprising:
a carrier having an upper side, said upper side being height-modulated with trenches periodically disposed in a first direction, each of the trenches having a trench depth (t);
a multilayer structure acting as a color filter, said multilayer structure being formed on the height-modulated upper side and being height-modulated;
said multilayer structure comprising a first layer, a second layer of dielectric material formed thereon, and a third layer formed on the second layer;
the trench depth (t) being greater than a thickness of the third layer;
the first and third layers each being formed of metallic material or semimetallic material:
wherein at least one or more of (a), (b), (c), (d), and (e) below are satisfied:
(a) a subwavelength grating period of the height-modulated multilayer structure is configured to cause a color change in the multilayer structure by the subwavelength grating period being laterally-varied from a first lateral position to a second lateral position within the multilayer structure of the security element;
(b) a grating profile of the height modulations of the of the height-modulated multilayer structure is laterally varied from a first lateral position to a second lateral position within the multilayer structure of the security element;
(c) metallic nanoparticles are incorporated in the second layer, and a distribution of the nanoparticles is laterally varied from a first lateral position to a second lateral position within the multilayer structure of the security element causing the color filter effect of the multilayer structure to vary laterally;
(d) a modulation depth of the height-modulated multilayer structure is laterally varied from a first lateral position to a second lateral position within the multilayer structure of the security element; or
(e) a layer thickness of the second layer is laterally varied from a first lateral position to a second lateral position within the multilayer structure of the security element, wherein the trench depth (t) is greater than a sum of a thickness of the third layer, a thickness of the second layer, and a thickness of the first layer.

17. The security element according to claim 16, wherein a height modulation of the upper side and of the multilayer structure is periodic in a first direction.

18. The security element according to claim 17, wherein the height modulation of the upper side and of the multilayer structure is additionally periodic in a second direction.

19. The security element according to claim 17, wherein the subwavelength grating period of the height-modulated multilayer structure is smaller than a largest wavelength of a range of electromagnetic radiation for which the security element is designed.

20. The security element according to claim 17, wherein the grating profile of the height-modulated multilayer structure is rectangular.

21. The security element according to claim 17, wherein the subwavelength grating period of the height-modulated multilayer structure is laterally varied.

22. The security element according to claim 17, wherein the grating profile of the height modulation is laterally varied.

23. The security element according to claim 16, wherein the trench depth (t) is equal to or greater than a sum of a thickness of the first layer and a thickness of the second layer.

24. The security element according to claim 16, wherein the trench depth (t) is equal to a sum of a thickness of the first layer and a thickness of the second layer and portions of the first layer and portions of the third layer form a closed film.

* * * * *